V. D. CURTIS.
COMBINED LAND ROLLER, PULVERIZER, AND SEED PLANTER.
APPLICATION FILED JAN. 16, 1909.
925,565.
Patented June 22, 1909.
3 SHEETS—SHEET 3.
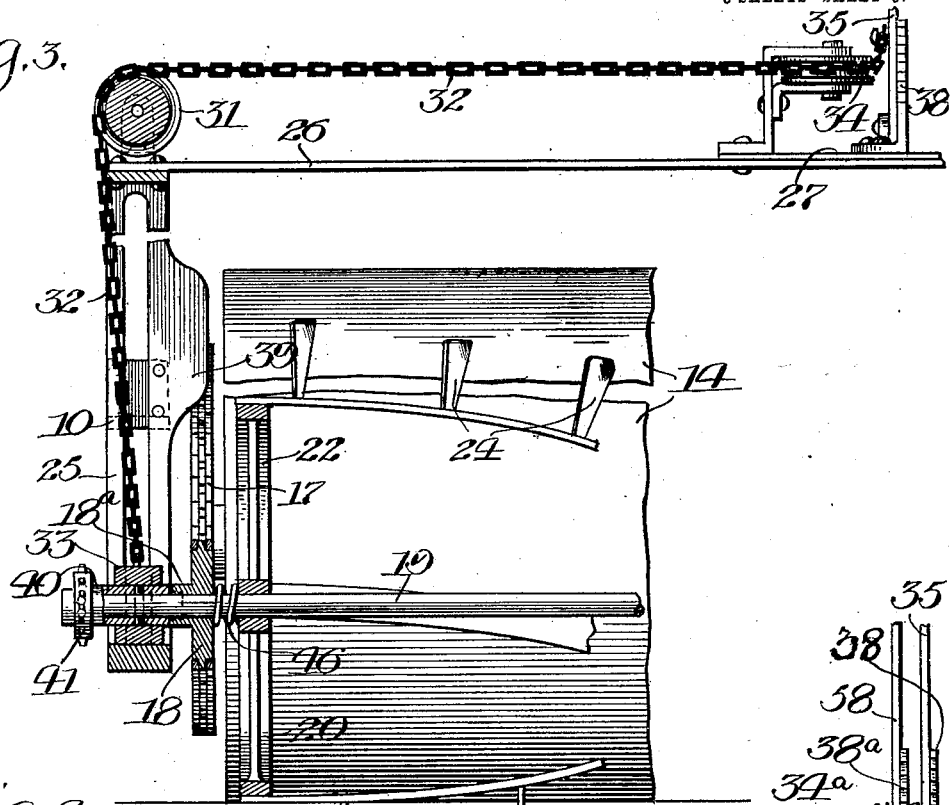
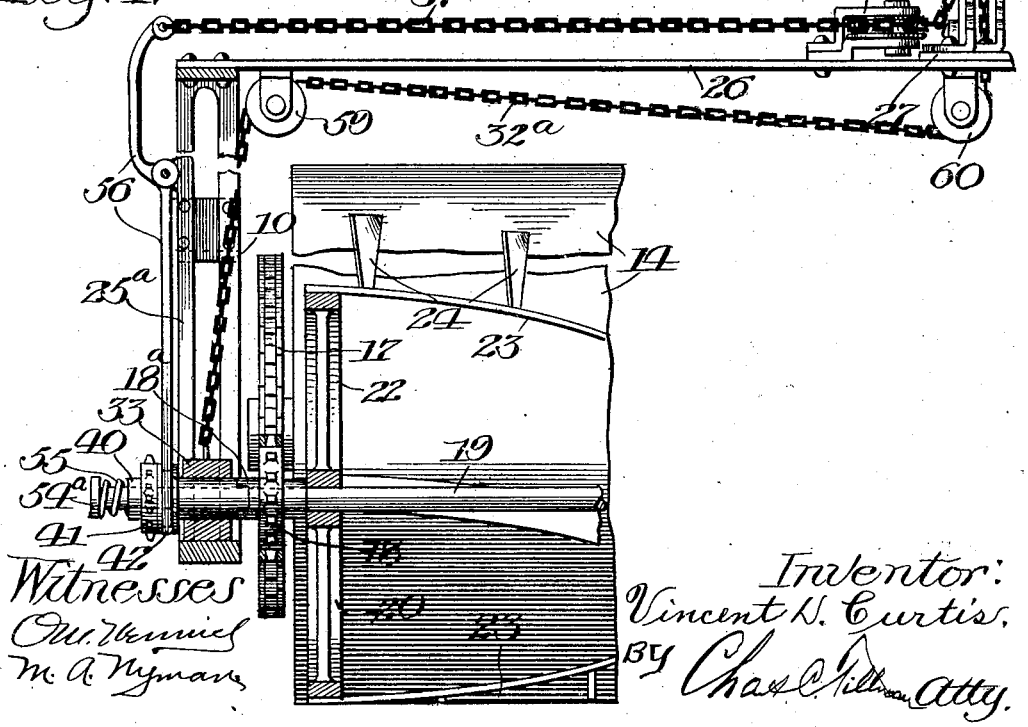

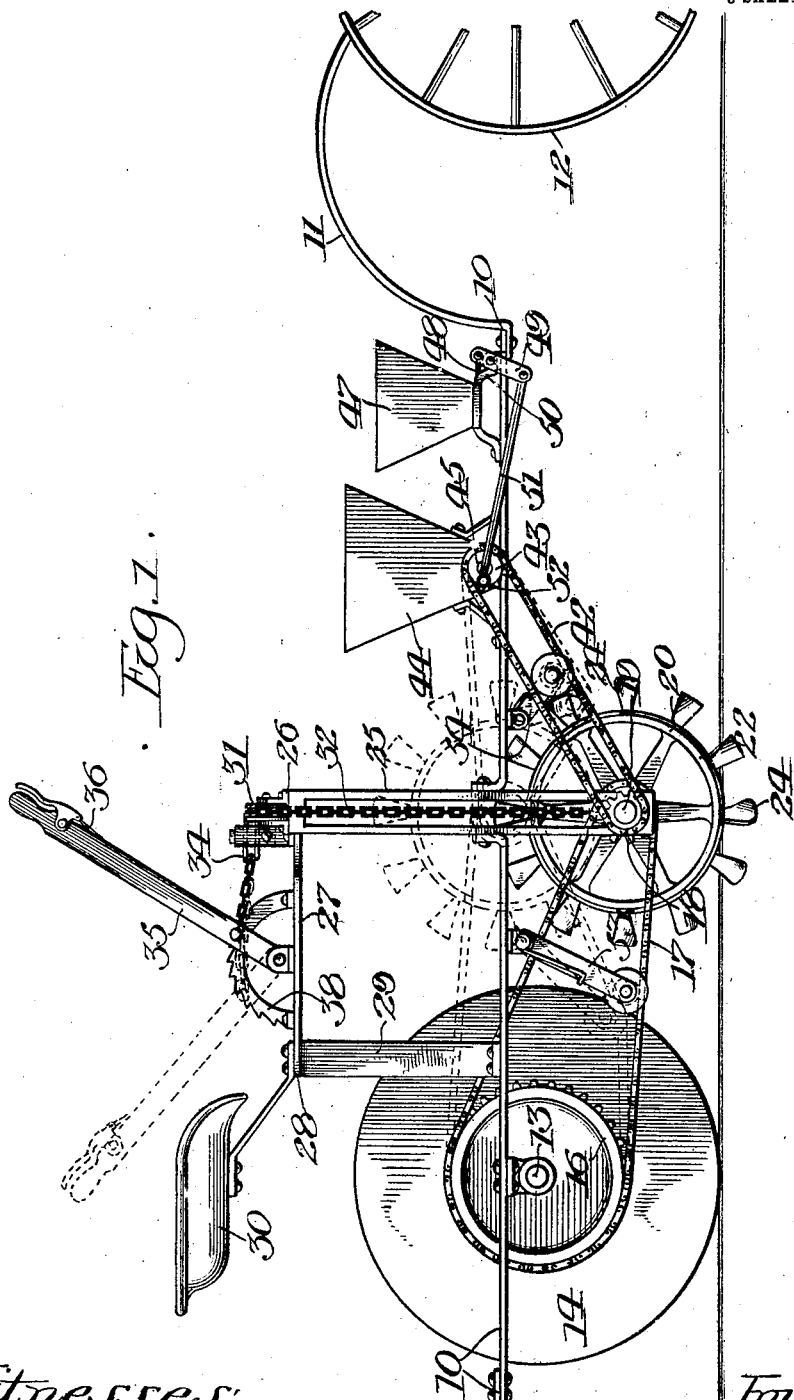

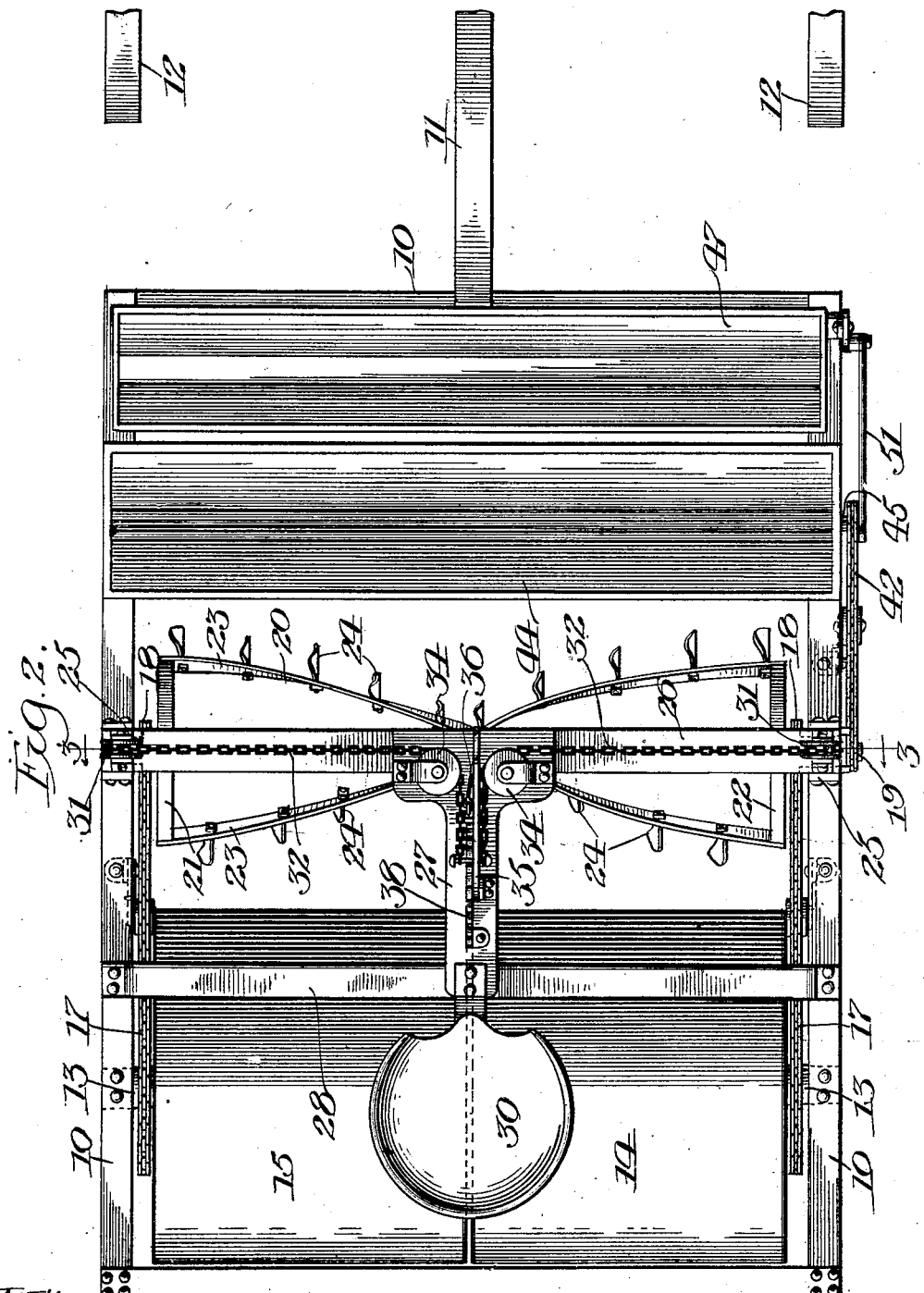

UNITED STATES PATENT OFFICE.

VINCENT D. CURTIS, OF CHICAGO, ILLINOIS.

COMBINED LAND ROLLER, PULVERIZER, AND SEED-PLANTER.

No. 925,565.  Specification of Letters Patent.  Patented June 22, 1909.

Application filed January 16, 1909. Serial No. 472,726.

*To all whom it may concern:*

Be it known that I, VINCENT D. CURTIS, a citizen of the United States, residing at Chicago, in the county of Cook and State of Illinois, have invented certain new and useful Improvements in a Combined Land Roller, Pulverizer, and Seed-Planter, of which the following is a specification.

This invention relates to certain new and useful improvements in a seed planting device or machine of that type in which a wheeled frame carrying a land roller, a pulverizer and seed-box or boxes is employed, and in which the operation of dropping or distributing seeds of various kinds on or over the ground, then pulverizing the soil, and then rolling the land is performed in one operation; and it consists in certain peculiarities of the construction, novel arrangement, and operation of the various parts thereof, as will be hereinafter more fully set forth and specifically claimed.

The principal object of the invention is to provide a machine of the above-named general character, which shall be simple and inexpensive in construction, strong, durable and efficient in operation, and so made that the pulverizer may be raised from its operative position, and the seed distributing mechanism, may be thrown out of gear, when desired.

Various other objects and advantages of the invention will be disclosed in the subjoined description and explanation.

In order to enable others skilled in the art to which my invention pertains, to make and use the same, I will now proceed to describe it, referring to the accompanying drawings, in which—

Figure 1 is a view in side elevation of a combined land roller, pulverizer and seed planter embodying one form of the invention; Fig. 2 is a plan view thereof; Fig. 3 is an enlarged sectional view taken on line 3—3 of Fig. 2 looking in the direction indicated by the arrows; and Fig. 4 is a similar view taken on the same line, showing a modification in the construction of the means used for raising the pulverizer from its operative position.

Like numerals of reference, refer to corresponding parts throughout the different views of the drawings.

The reference numeral 10 designates the main frame, which may be of any suitable size, form and material, but preferably rectangular in shape as shown in Fig. 2 of the drawings, and has its front portion provided with an arched part 11 to which the wheels 12 of a truck equipped with the necessary draft appliances (not shown) may be connected in the ordinary or any well-known way, so that in turning the machine the wheels 12 may pass under the arched portion 11 of the main frame.

Transversely journaled on the rear portion of the frame 10 is a shaft 13 on which the land roller, consisting of two cylindrical rollers or bodies 14 and 15, is mounted. On each end of the shaft 13 is mounted a sprocket-wheel 16 over each of which is extended a sprocket-chain 17 which chains pass over sprocket-wheels 18 mounted on a shaft 19 and near the ends thereof, which shaft is transversely and movably mounted below the main frame 10 and in front of the land roller in the manner to be presently explained.

The shaft 19 has mounted thereon a pulverizer, which is herein designated as a whole by the reference numeral 20, and consists of two wheels 21 and 22, one of which is located on the shaft 19 near and inwardly of each of the sprocket-wheels 18 thereon. The wheels 21 and 22 are connected longitudinally by means of a series of bars 23 which are preferably slightly spiral or serpentine or S-shaped as shown in Fig. 2 of the drawings, and each of said bars is provided on its outer surface with a series of blades or cutters 24, each of which, by preference, is helical in shape, or somewhat like the blade of a propeller, and said blades or cutters are located on the bars 23 in such a manner that one of their edges will be presented in a cutting position to the ground in the rotation of the pulverizer 20, so as to thoroughly cut up or pulverize the earth.

As shown in Figs. 1, 2 and 3 the main frame 10 is provided on each of its sides at a suitable distance in front of the land roller with a slotted upright standard 25, each of which standards is firmly secured to the sides of the frame and extends vertically above and below the same, which standards furnish at their lower ends the bearings and guideways for the shaft 19 on which the pulverizer is mounted. The upper ends of the standards 25 are transversely connected by means of a bar 26 which has mounted on its central portion a rearwardly and horizontally extended bracket 27, the rear end of which is secured to a transversely disposed bar 28 located above the front portion of the land roller, and said last-named bar has downturned portions 29 at its ends, which portions are secured to the sides of the main frame. The bar 28 and its downturned portions 29 serve to brace the main frame and also furnish a support for the seat 30 to be used by the driver or operator of the machine.

Journaled on each end of the bar 26 is a pulley 31 over which are passed chains 32, each of which has one of its ends secured to a journal-box 33 for the shaft 19 which journal-boxes are mounted for vertical movement in the slots of the standards 25, which standards will act as guide-ways therefor. The chains 32 are extended around pulleys 34 journaled on the upper portion of the bracket 27 at about the middle of the bar 26, and are connected at their upper ends to a lever 35 which is fulcrumed on the bracket 27 and carries a grip-rod or pawl 36 to engage the teeth of a segmental rack 38 mounted on the bracket 27, as is clearly shown in Fig. 1 of the drawings.

One of the standards 25, and usually that one on the right hand side of the machine, is provided on its inner portion at a suitable distance above its lower end with a cam 39 to co-act with the sprocket-wheel 18 on the same side of the machine with said cam when the pulverizer is raised to the position by means of the lever 35 and chains 32 shown by dotted lines in Fig. 1 of the drawings. The sprocket-wheel 18 adjacent to the cam 39 is mounted for longitudinal movement on the shaft 19, but rotates with said shaft and has a clutch-face 18ᵃ on the outer end of its hub to engage the clutch-face on the inner end of a sleeve 40 mounted on the end of the shaft 19 adjacent to the cam 39, which sleeve has at its outer portion a sprocket-wheel 41 around which is passed a sprocket-chain 42 which also engages a sprocket-wheel 43 on the shaft of one of the seed-boxes or hoppers 44 which is transversely located on the upper portion of the main frame 10 in front of the roller, and which seed-box may be provided in its lower portion with any suitable mechanism for permitting seed to be discharged therefrom, and actuated by the shaft 45 on which the sprocket-wheel 43 is mounted. Located on the shaft 19 (see Fig. 3) between one of the wheels 22 of the pulverizer and the sprocket-wheel 18 is a spring 46 which will normally hold the clutch-face 18ᵃ in engagement with the clutch-face on the inner end of the sleeve 40, but will permit the sprocket-wheel 18 to be disengaged from said sleeve when the pulverizer is raised to the position shown by dotted lines in Fig. 1, so that the sprocket-wheel 18 will co-act with the cam 39 in the upward movement of the pulverizer.

Transversely mounted on the frame 10 in front of the seed-box or hopper 44 is another seed-box or hopper 47, which may be equipped in its lower portion with means for discharging the seed therefrom, which means may be of the ordinary or any preferred construction, but in the present instance has extended therefrom a rod 48 to which is secured one end of a lever 49 which is fulcrumed on a suitable bracket 50 mounted on the supporting-frame, and is connected at its other end by means of a rod 51 to a wrist-pin 52 on the gear 43 of the shaft 45 which operates the distributing mechanism of the box 44 which may be used for grain of larger size than that used in the box 47, which is preferably located on the frame 10 in advance of the other seed-box.

Pivotally secured to each of the sides of the frame 10 and depending therefrom is a belt tightener 53 of the ordinary or any preferred construction, which tighteners co-act with the sprocket-chains 17 and similarly secured on like parts of the frame 10, but in front of each of the standards 25 is another belt tightener 54 which co-acts with the sprocket-chain 42 and which will take up the slack therein when the pulverizer is raised to the position shown by dotted lines in Fig. 1 of the drawings.

From the above description of my improvements it will be seen that the improved combined land roller, pulverizer and seed planter constructed according to my invention is of an extremely simple and inexpensive nature and is especially well adapted for use by reason of the ease with which the pulverizer may be raised from its operative position, and it is further obvious that the device is susceptible of considerable modification without material departure from the principles and spirit of the invention, and for this reason I do not desire to be understood as limiting myself to the precise form and arrangement of the several parts of the device as herein set forth in carrying out the invention in practice; for example, in some cases the construction shown in Fig. 4 may be employed. In this form of the device the construction is very similar to that above-described, except that a standard 25ᵃ from which the cam 39 is omitted is used on one side of the main frame, and the shaft 19 is provided on its end adjacent to said standard with a head 54ᵃ between which and the outer end of the sleeve 40 is interposed a spring 55 which will normally hold the clutch-faced inner end of the sleeve 40 in engagement with the clutch-face 18ᵃ of the sprocket-wheel 18, which sprocket-wheel in this instance is immovable on the shaft 19, but has a journal-box 33 to move vertically in the slot of the standard 25ᵃ, as in the other construction.

The inner portion of the hub of the sprocket-wheel 41 in this modified form has loosely surrounding the same a collar 42 from which is extended vertically a lever 56 which is fulcrumed to the upper portion of the standard 25ª, and has connected thereto one end of a chain 57 which is extended around one of the pulleys 34ª and connected at its other end to a lever 58 which is fulcrumed on the bracket 27 near the lever 35, and may be similarly equipped with a griprod or pawl and a segmental rack 38ª. Connected at their lower ends to each of the journal-boxes 33 of the shaft 19 are chains 32ª which are extended over and under pulleys 59 and 60, respectively, which are supported on the cross-bar 26 in any suitable manner. The upper ends of these chains are secured to the lever 35, and it is apparent that by moving said lever in the proper direction the pulverizer will be raised out of its operative position, when by moving the lever 58 in the proper direction the sleeve 40 carrying the sprocket-wheel 41 will be thrown out of engagement with the clutch-face 18ª, which operation will also throw the driving mechanism for the seed hoppers or boxes out of gear.

Having thus fully described my invention, what I claim as new, and desire to secure by Letters-Patent, is—

1. The combination with a wheeled main frame, of a land roller transversely journaled on the rear portion thereof, an upright standard mounted on each side of the main frame in front of the land roller and each having a guide-way therein, a shaft mounted in the guide-ways of said standards for vertical movement, a pulverizer mounted on said shaft, a sprocket-wheel mounted for longitudinal movement on said shaft near one of said standards and geared to the shaft of the land roller, means to raise the pulverizer from its operative position, and means on one of said standards to co-act with the movable sprocket-wheel in the upward movement of the pulverizer.

2. The combination with a wheeled main frame, of a land roller transversely journaled on the rear portion thereof, an upright standard mounted on each side of the main frame in front of the land roller and each having a guide-way, a shaft mounted for vertical movement in the guide-ways of said standards, a sprocket-wheel mounted on said shaft near one of its ends and having a clutch-face on its outer portion, gearing uniting said sprocket-wheel and the shaft of the roller, a pulverizer mounted on said shaft, a sleeve on said shaft, a sprocket-wheel on said sleeve, means to raise the pulverizer and its shaft, and means to throw the sprocket-wheel on said sleeve out of gear with the sprocket-wheel on said shaft.

3. The combination with a wheeled main frame, of a land roller transversely journaled on the rear portion thereof, an upright standard mounted on each side of the main frame in front of the land roller and each having a guide-way therein, a pulverizer mounted for vertical movement in the guide-ways of said standards, gearing uniting the land roller and pulverizer, a seeding mechanism transversely mounted on the main frame in front of the pulverizer, a sprocket-wheel carried by the seeding mechanism for the operation thereof, gearing uniting said sprocket-wheel and the pulverizer shaft, means to raise the pulverizer from its operative position, and means on one of said standards to co-act with a member on the pulverizer shaft to throw the seeding mechanism out of gear in the upward movement of the pulverizer.

VINCENT D. CURTIS.

Witnesses:
CHAS. C. TILLMAN,
M. A. NYMAN.